United States Patent
Levin-Michael et al.

(10) Patent No.: US 7,155,573 B1
(45) Date of Patent: Dec. 26, 2006

(54) CACHE FALL THROUGH TIME ESTIMATION

(75) Inventors: Orit Levin-Michael, Newton, MA (US); Josef Ezra, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 280 days.

(21) Appl. No.: 10/853,035

(22) Filed: May 25, 2004

(51) Int. Cl.
*G06F 12/08* (2006.01)
(52) U.S. Cl. ...................... 711/133; 711/145
(58) Field of Classification Search ............ 711/133, 711/145
See application file for complete search history.

(56) References Cited

U.S. PATENT DOCUMENTS

| | | | |
|---|---|---|---|
| 5,341,493 A | 8/1994 | Yanai et al. | |
| 5,381,539 A | 1/1995 | Yanai et al. | |
| 5,537,568 A | 7/1996 | Yanai et al. | |
| 5,592,432 A | 1/1997 | Vishlitzky et al. | |
| 5,751,993 A * | 5/1998 | Ofek et al. | 711/136 |
| 6,035,375 A | 3/2000 | Yanai et al. | |
| 6,457,102 B1 * | 9/2002 | Lambright et al. | 711/129 |
| 6,594,742 B1 | 7/2003 | Ezra | |
| 6,715,039 B1 | 3/2004 | Michael et al. | |

* cited by examiner

*Primary Examiner*—Hiep T. Nguyen
(74) *Attorney, Agent, or Firm*—Daly, Crowley, Mofford and Durkee, LLP (57) ABSTRACT

A method for estimating the fall through time of a cache includes maintaining local statistics associated with each data cache slot replaced by a processor, reading from a memory global statistics related to each data cache slot replaced by a plurality of processors, calculating new global statistics, and estimating a fall through time of the cache in response to the global statistics at a predetermined rate. When the global statistics are the result of at least a threshold number of data cache slots having been replaced, the new global statistics are calculated by weighting the global statistics by a factor of less than one and adding the weighted global statistics to the local statistics. When the global statistics are not the result of at least a threshold number of data cache slots having been replaced, the new global statistics are calculated by adding a time related to the lapsed time to a global sum value associated with the time stamp difference of the replaced data cache slots. In a multi-processor computer system, each of the processors accesses the global memory to update the global statistics at a different time. The fall through time is estimated continuously at a first predetermined rate and the global statistics are updated at a second predetermined rate that, in one embodiment, is a multiple of the first predetermined rate.

22 Claims, 4 Drawing Sheets

CACHE FALL THROUGH TIME ESTIMATION

CROSS-REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to fall through time estimation of a cache and, more particularly, to a cache fall through time estimation technique in a multi-processor data storage system.

BACKGROUND OF THE INVENTION

Computer systems may include different resources used by one or more host processors. These resources may include, for example, data storage systems containing one or more data storage devices, such as the Symmetrix™ family of data storage systems manufactured by EMC Corporation of Hopkinton, Mass. These data storage systems may be coupled to one or more host processors and provide storage services to each host processor. A host processor may perform a variety of data processing tasks and operations using the data storage system. For example, a host processor may perform basic system I/O operations in connection with data requests, such as data read and write operations and also administrative tasks, such as data backup and mirroring operations.

Performance of a data storage system may be improved by using a cache. In the case of a disk drive system, the cache may be implemented using a block of semiconductor memory that has a lower data access time than the disk drive. Data that is accessed is copied from the disk drives to the cache so that subsequent accesses of the data may be made to the cache rather than to the disk drives. Once the cache is full, data that has not been accessed recently may be removed from the cache and written back to the storage device to make room for new data. A line of data or a data element in the cache is often referred to as a "cache slot."

The decision as to which cache slot to select for replacement depends on how the cache is managed. Generally, the cache slot selected for replacement is one that has not been accessed recently. One implementation of this approach to cache slot replacement requires maintaining a linked list, sometimes referred to as a "least recently used (LRU) queue," in which each cache slot is linked to another cache slot by forward and backward pointers. When a data element is placed in cache, it is placed at the head of the queue. As elements are added to the head of the list, subsequent elements progress toward the tail of the list. In this fashion, generally, the least recently used cache slot will be at the tail of the queue and the most recently used cache slot will be at the head of the queue.

Promotion of a cache slot refers to movement of a cache slot to a new position in the replacement queue, such that the promoted cache slot is less likely to be displaced from the replacement queue. Promotion may be used to keep the most active data elements in cache. For example, in LRU cache management schemes, the policy is to promote a cache slot to the head of the queue every time there is a read hit to the cache slot.

One parameter that is sometimes used in cache management is the average lapsed time that data elements remain in a cache. This parameter is often referred to as the "fall through time" or "FTT". Thus, the fall through time refers to the average amount of time it takes for an unpromoted slot once it enters the replacement queue at the head position to exit the replacement queue through the tail position and provides an indication of the stress on the cache.

Cache fall through time is sometimes used to determine whether a cache slot is a candidate for promotion. For example, in a cache management scheme described in a U.S. Pat. No. 5,592,432, entitled "Cache Management System Using Time Stamping for Replacement Queue," to Vishlitzky et al., which is assigned to EMC Corporation of Hopkinton, Mass. and which is hereby incorporated herein by reference, a cache slot is promoted to the head of the queue only if its time stamp (i.e., the length of time that the particular data element has been in cache) is greater than a predetermined percentage of the fall through time. Another example of the use of fall through time in implementing a promotion policy is described in a U.S. Pat. No. 6,715,039, entitled "Cache Slot Promotion in a Replacement Queue Cache Using Determinations of Probabilities and Costs," to Levin Michael, et al., which is assigned to EMC Corporation of Hopkinton, Mass. and which is hereby incorporated herein by reference. Cache fall through time is also used as a parameter reported to a service processor or host processors for purposes of monitoring cache usage and stress.

One technique for determining the fall through time of a cache is described in the above-referenced U.S. Pat. No. 6,715,039, the fall through time is calculated for each slot by taking a first time stamp when a slot is lastly placed at the head of the replacement queue and then taking a second time stamp when that same slot exits the replacement queue. The difference between the second time stamp value and the first time stamp value for each slot may be used to calculate the cache fall through time. Specifically, the average of the time stamp difference for a large number of slots represents the cache fall through time. Generally, a large fall through time is associated with a large cache and a smaller fall through time is associated with a smaller cache. In addition to the size of the cache, the fall through time is a function of cache workload.

SUMMARY OF THE INVENTION

According to the invention, a method for estimating the fall through time of a cache accessible by a plurality of processors includes maintaining local statistics associated with each data cache slot replaced by the processor, reading from a memory global statistics related to each data cache slot replaced by the plurality of processors, calculating new global statistics in response to the read global statistics and the local statistics, and estimating at a predetermined rate the fall through time of the cache in response to the global statistics. With this arrangement, the fall through time estimate responds rapidly to changes in cache usage and generally experiences more gradual changes than achieved with conventional methods.

Embodiments of the invention may include one or more of the following features. The fall through time is estimated at a first predetermined rate in response to the read global statistics and at a second predetermined rate in response to the new global statistics. In a multi-processor computer system, each of the processors accesses a global memory to read the global statistics and to update the global statistics at a different time. The global memory is read periodically at the first predetermined rate and new global statistics are calculated and written to the global memory at a second predetermined rate that is a multiple of the first predetermined rate. New global statistics are calculated in different ways depending on whether the global statistics are the result of at least a threshold number of data cache slots having been replaced (i.e., whether a global count value is equal to at least a predetermined, threshold number). If the global count value is equal to at least the predetermined number, then the new global statistics are calculated by weighting the global statistics and adding the weighted global statistics to the local statistics. If the global count value is less than the predetermined number, then the new global statistics are calculated by adding a time related to the lapsed time to a sum value associated with the time stamp difference of the replaced data cache slots by one or more of the CPUs.

According to a further embodiment of the invention, a method for estimating a fall through time of a cache includes maintaining a count value (count) equal to a number of data cache slots replaced by a processor and a sum value (sum) equal to a summation of a time stamp difference associated with each data cache slot replaced by the processor, reading from a memory accessible by a plurality of processors a global count value (Gcount) related to a number of data cache slots replaced by the plurality of processors and a global sum value (Gsum) related to the summation of the time stamp difference associated with each of the data cache slots replaced by the plurality of processors, wherein the reading is performed at a unique time, which is likely to be different than the time that the memory is read by others of the plurality of processors. The method further includes calculating a new global count value (Gcountnew) in response to the count value (count) and the global count value (Gcount) and calculating a new global sum value (Gsumnew) in response to the sum value (sum) and the global sum value (Gsum), wherein calculating is performed at a unique predetermined time different than a predetermined time that the calculating is performed by others of the plurality of processors. A fall through time of the cache is estimated in response to the new global count value (Gcountnew) and the new global sum value (Gsumnew).

Also described is a system comprising a cache including a plurality of slots and a plurality of processors, each having access to the cache, maintaining local slot replacement statistics associated with the data cache slots replaced by the processor, reading global slot replacement statistics related to the data cache slots replaced by the plurality of processors and updating the global slot replacement statistics. Each processor comprises a fall through time estimator responsive to the global slot replacement statistics for estimating a fall through time of the cache at a predetermined rate.

In accordance with a further aspect of the invention, an article comprises a storage medium having stored thereon instructions that when executed by a machine result in the following: maintaining local statistics associated with each data cache slot replaced by the processor, reading from a memory global statistics related to each data cache slot replaced by a plurality of processors, calculating new global statistics in response to the read global statistics and the local statistics, and estimating at a predetermined rate a fall through time of the cache in response to the global statistics. The new global statistics are calculated in different ways depending on whether the global statistics are the result of at least a threshold number of data cache slots having been replaced.

BRIEF DESCRIPTION OF THE DRAWINGS

The foregoing features of this invention, as well as the invention itself may be more fully understood from the following description of the drawings in which.

DESCRIPTION OF THE PREFERRED EMBODIMENT

Figure 1:
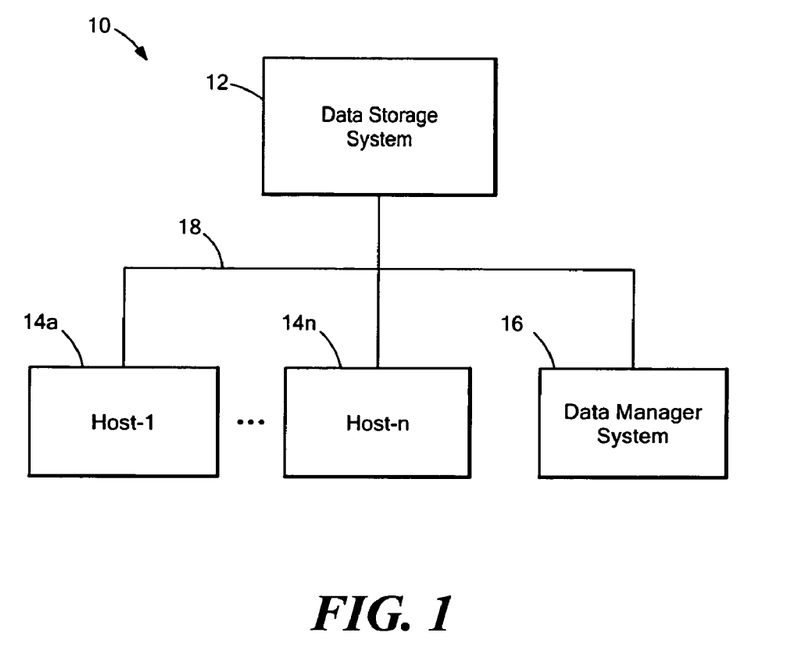
FIG. 1 is a block diagram of a computer system employing the present invention.

Referring now to FIG. 1, an example of a computer system according to the present invention is shown. The computer system 10 includes a data storage system 12 connected to host systems 14a–14n and a data manager system 16 through communication medium 18. In this embodiment of the computer system 10, the n hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n and the data manager system 16 may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor systems, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems 14a–14n as well as the data manager system 16 may perform different types of data operations in accordance with different types of administrative tasks. In the embodiment of FIG. 1, any one of the host computers 14a–14n may issue a data request to the data storage system 12 to perform a data operation. For example, an application executing on one of the host computers 14a–14n may perform a backup, mirroring or other administrative operation and may do so while performing data requests to the data storage system 12.

Figure 2:
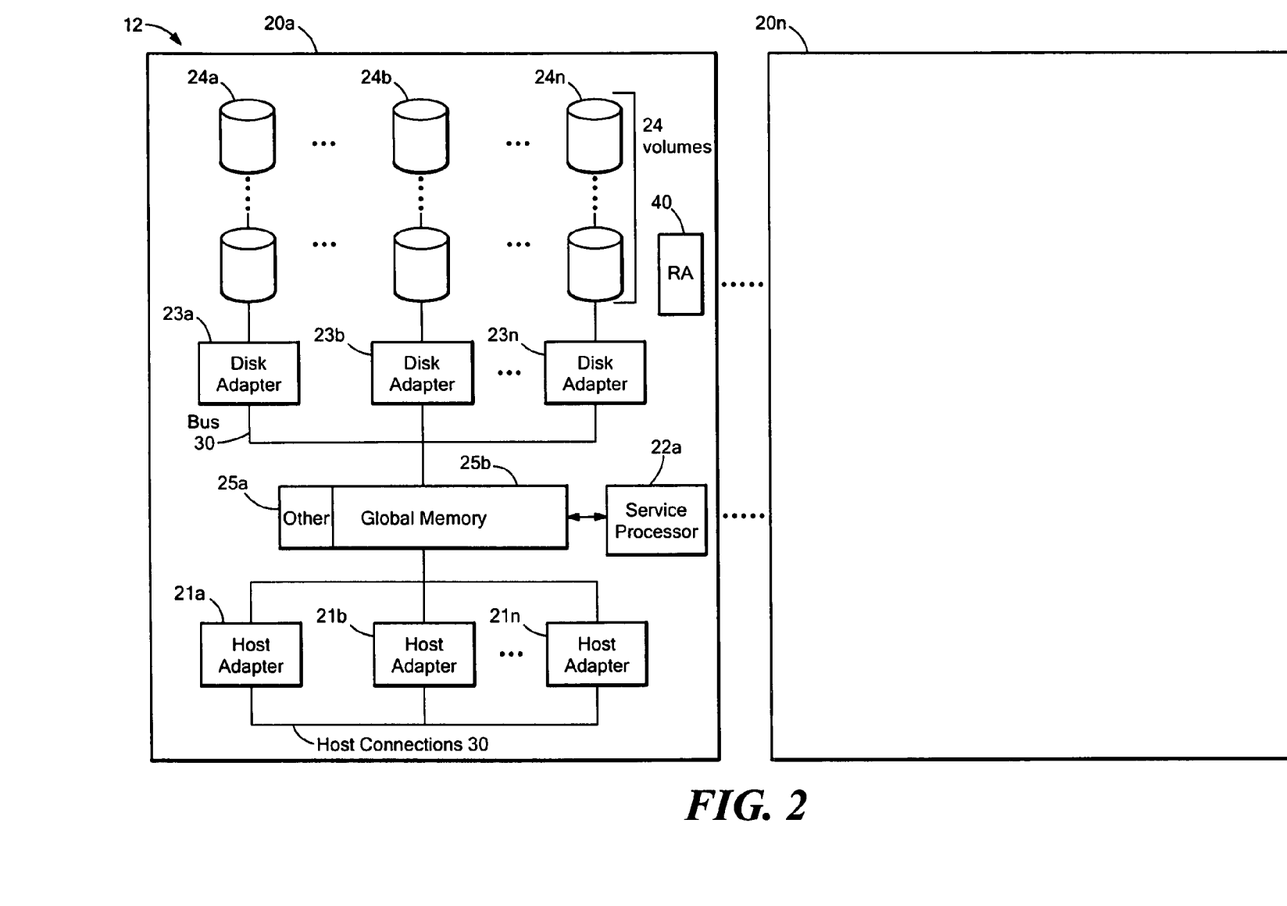
FIG. 2 shows the data storage system of FIG. 1.

Referring now to FIG. 2, shown is an example of an embodiment of the data storage system 12 that may be included in the computer system 10 of FIG. 1. Included in the data storage system 12 of FIG. 2 are Symmetrix™ storage systems 20a–20n as manufactured by EMC Corporation of Hopkinton, Mass. In this particular example, each of the Symmetrix™ storage systems 20a–20n may be interconnected (not shown) as well as being connected to the host and data manager systems through one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of data storage systems 20a–20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a–24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a–23n are connected, for example, by a bus 30 to a cache 50 (FIG. 3) in a particular portion of memory designated as global memory 25b. The DAs 23a–23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements in connection with a data request as may be made from the different host computer systems 14a–14n. This performance data may be gathered and stored, for example, in the global memory and/or other storage area.

The system 20a may also include one or more host adapters ("HAs") or directors 21a–21n. Each of these HAs may be used to manage communications and data operations between one or more host systems and the global memory.

The particular data storage system as described in this embodiment, such as a Symmetrix™ system manufactured by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems 14a–14n provide data and access control information through channels to the storage systems, and the storage systems may also provide data to the host systems also through the channels. The host systems access data on the disk drives of the storage systems by addressing logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix™ data storage system and a host system. The RAs may be used in facilitating communications between two Symmetrix™ data storage systems. The DAs may be used in connection with facilitating communications to the associated disk drive(s) and LV(s) residing thereon.

The DA may cause I/O operations to be performed on a volume or device. In the following description, a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

As described above, an embodiment may include a cache 50 (FIG. 3) in the global memory portion 25b of FIG. 2. An embodiment may include a single or multiple replacement queue arrangement in the cache. An example of an embodiment that includes a cache using multiple replacement queues is described in pending U.S. patent application Ser. No. 09/535,134, entitled "Segmenting Cache to Provide Varying Service Levels", filed Mar. 24, 2000, and assigned to EMC Corporation of Hopkinton, Mass. An example of a system with a single cache memory is described in issued U.S. Pat. No. 5,381,539, Yanai et al., entitled "System and Method for Dynamically Controlling Cache Management", and also assigned to EMC Corporation of Hopkinton, Mass.

Figure 3:
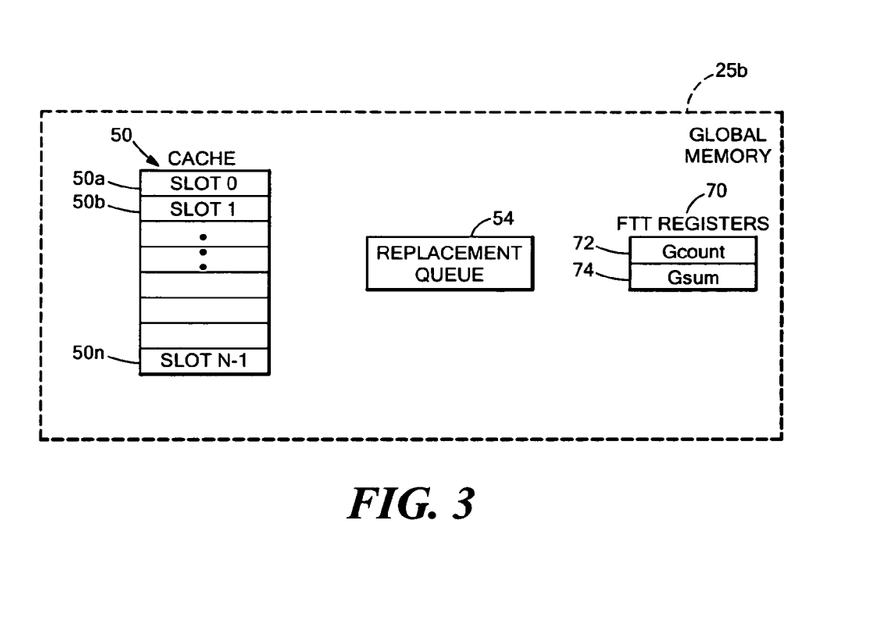
FIG. 3 is a schematic diagram of the global memory of the data storage system of FIG. 2.

Referring also to FIG. 3, the global memory 25b (FIG. 2) includes a cache 50, a replacement queue 54, and fall through time, or FTT registers 70. The cache contains a plurality of slots 50a–50n, each for storing a respective data element. Cache slots storing a valid copy of storage data are referred to herein as "data cache slots" in order to distinguish from cache slots containing useless data for purposes of calculating the fall through time of the cache.

When data is read from a storage device or volume 24, a copy of the data is also saved in the cache 50, along with the address from which the data is read. Upon subsequent read operations, it is determined if any of the required addresses is already in the cache. If the required address is in the cache (i.e., a read hit occurs), then the cache immediately returns the data having the required address. Otherwise, the data is fetched from the volume or device 24 and a copy of the data along with its address is saved in the cache. When a host 14a–14n writes data to a storage device or volume, it is first written to cache by a host adapter 21a–21n before being destaged to the storage device or volume. Thus, the cache is accessible for use by disk adapters 23a–23n and host adapters 21a–21n. Since each of the adapters contains a processor, the cache is used by a plurality of processors.

The replacement queue 54 stores information associated with each cache slot 50a–50n for use in managing the cache (i.e., determining which cache slot to replace with new data as the need arises) and may take various forms depending on the type of cache management scheme implemented. In general, the replacement queue 54 stores information about which cache slot is the least recently used. As one example, the replacement queue 54 may take the form of a doubly linked list of entries with each entry containing a forward pointer and a backward pointer as described in the above-referenced U.S. Pat. No. 5,592,432.

A time stamp value is stored in the global memory 25b in association with each data element stored in the cache 50. The time stamp value indicates, in real or relative time, when the data element entered the cache. The time stamp can be stored in the replacement queue 54 in association with the respective cache slot, in the cache slot 50a–50n itself for the data element, or in a separate array or table indexed by the cache memory slot number. The time stamp value is used in the FTT estimation technique of FIG. 5, as will be described.

FTT registers 70 contain statistics, referred to herein as "global slot replacement statistics" or simply "global statistics," related to the replacement of the cache slots 50a–50n by the plurality of host adapters 21a–21n and disk adapters 23a–23n, as will be described. The global slot replacement statistics are used by the processors of the host adapters 21a–21n and the disk adapters 23a–23n (referred to hereinafter alternatively as processors 21a–21n and 23a–23n) in estimating the fall through time of the cache 50 according to the process of FIG. 5. More particularly, the global slot replacement statistics are periodically read and updated by each of the processors 21a–21n and 23a–23n that enter data elements in the cache 50, as will be described. FTT register 72 contains a value related to a number of data cache slots replaced by the plurality of processors (Gcount) and FTT register 74 contains a value related to a summation of a time stamp difference associated with each of the data cache slots replaced by the plurality of processors (Gsum). As will be discussed, each of the processors 21a–21n and 23a–23n that uses the cache 50 and that performs the fall through time estimation process of FIG. 5 accesses the FTT registers 70 at different, unique times. In this way, frequent updating of the global statistics and of the fall through time estimate is achieved, and the resulting fall through time estimate has gradual, rather than jumpy variations.

Figure 4:
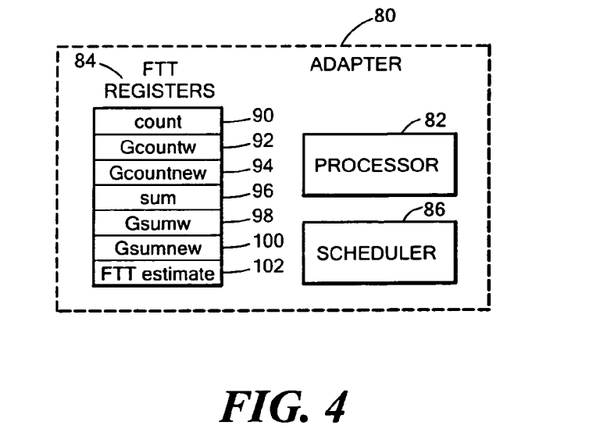
FIG. 4 is a schematic diagram of an illustrative adapter of the data storage system of FIG. 2.

Referring to FIG. 4, an illustrative adapter 80, such as may be a host adapter 21a–21n or a disk adapter 23a–23n, includes a processor 82, a scheduler 86, and further FTT registers 84 in which are stored statistics, referred to herein as "local slot replacement statistics" or simply "local statistics," associated with the replacement of data cache slots by the particular processor 82. The register 90 contains a count value (count) that is incremented by one each time a data cache slot is replaced by the processor 82 and thus, is equal to the number of data cache slots replaced by the processor. The register 96 contains a sum value (sum) that is incremented each time a data cache slot is replaced by the processor 82 by an amount equal to a time stamp difference associated with the replaced data cache slot and thus, is equal to the summation of the time stamp difference associated with each data cache slot replaced by the processor.

More particularly, each time a data cache slot is replaced by the processor 82, the time stamp difference associated with the slot exiting cache is determined. This can be achieved by calculating the difference between a time stamp indicating the time of exit minus the initial time stamp associated with the cache slot at the time the data entered the cache slot (i.e., the time stamp difference). Since the adapter clock has a limited range (e.g., 4 hours), the clock "wrapping around" (i.e., the clock reaching its maximum and resetting) must be addressed. In one embodiment, the time when a slot exits the cache is compared to the initial time stamp when the data in the slot entered the cache. If the exiting time stamp is less than the initial time stamp, then it is assumed that the clock has wrapped around. In this case, the exiting time stamp is added to the clock range and the initial time stamp is subtracted from that sum to arrive at the age of the slot (e.g., the time stamp difference).

Additional local statistics include a global weighted count value (Gcountw) in register 92, a new global count value (Gcountnew) in register 94, a global weighted sum value (Gsumw) in register 98, and a new global sum value (Gsumnew) in register 100, as shown. Also stored in the local FTT registers 84 is an FTT estimate 102. Registers 90–102 are used in connection with the fall through time estimation process described in conjunction with FIG. 5. As will be discussed, the FTT estimate is calculated continuously, at a first predetermined rate. With this arrangement, the resulting fall through time estimate responds rapidly, without significant delay, to changes in cache usage and also, generally, experiences gradual changes in the estimate as reflects actual cache usage.

Figure 5:
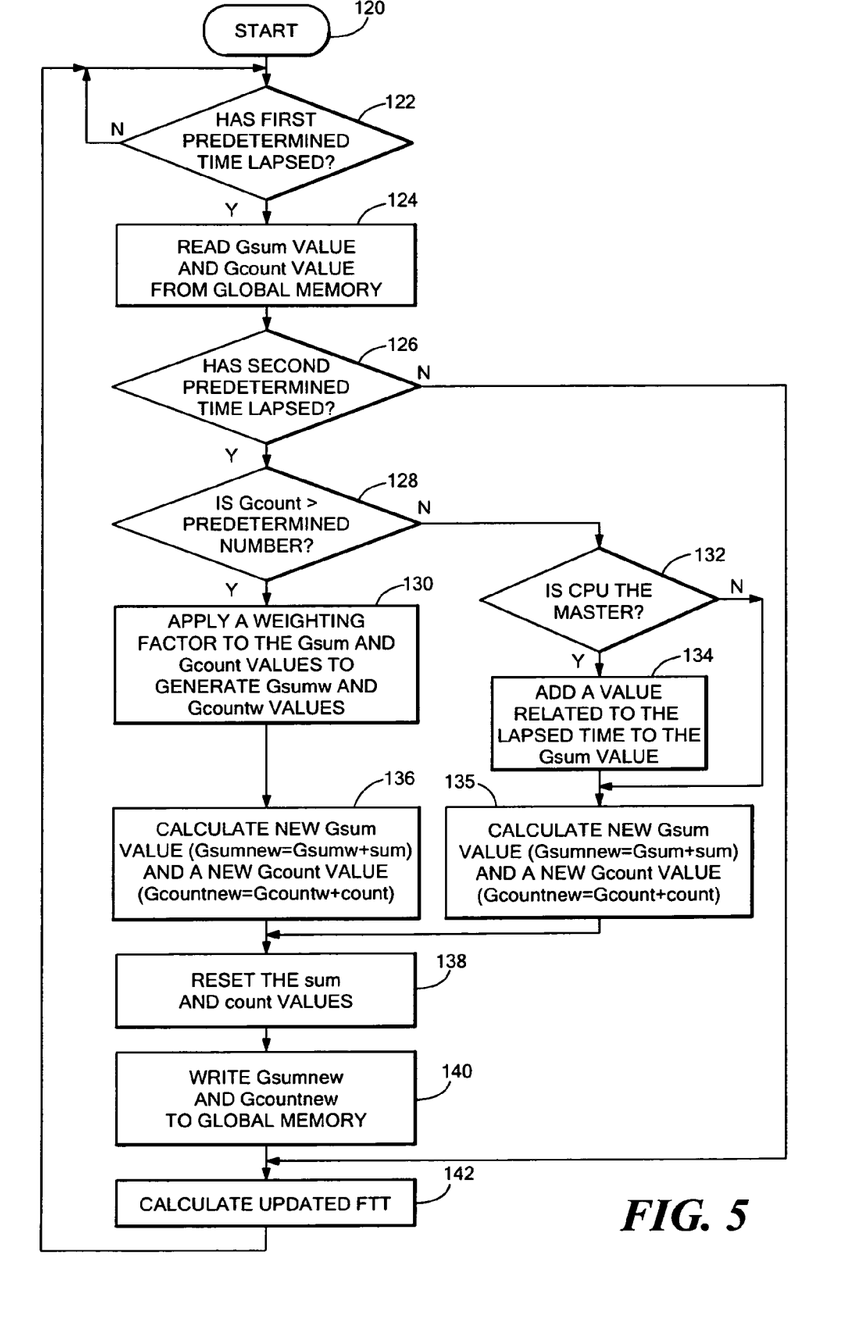
FIG. 5 is a flow diagram illustrating a process for estimating the fall through time of a cache according to the invention.

FIG. 5 shows a flow diagram illustrating techniques which would be implemented in an electronic device or in a computer processor, such as the processor 82 (FIG. 4). Rectangular elements, herein denoted "processing blocks," can represent computer software instructions or groups of instructions. Diamond shaped elements, herein denoted "decision blocks," can represent computer software instructions, or groups of instructions that affect the execution of the computer software instructions represented by the processing blocks.

Alternatively, the processing and decision blocks represent steps performed by functionally equivalent circuits, such as a digital signal processor circuit or application specific integrated circuit (ASIC), or discrete electrical components. The flow diagram does not depict the syntax of any particular programming language. Rather, the flow diagram illustrates the functional information one of ordinary skill in the art requires to fabricate circuits or to generate computer software to perform the processing required of the particular apparatus. It will be appreciated by those of ordinary skill in the art that, unless otherwise indicated herein, the particular sequence of blocks described is illustrative only and can be varied without departing from the spirit of the invention. Thus, unless otherwise stated, the blocks described below are unordered meaning that, when possible, the steps can be performed in any convenient or desirable order.

The flow diagram of FIG. 5 illustrates a process performed by processor 82 (FIG. 4), and, more generally, by each of the processors associated with the host adapters 21a–21n and disk adapters 23a–23n, for estimating fall through time of the cache 50. The process commences at block 120, following which it is determined at block 122 whether or not a first predetermined time has lapsed. In the illustrative embodiment, this is achieved by calling the routine that causes the tasks described below to be executed at a rate established by the first predetermined time (i.e., by scheduling the following tasks, rather than by continuous polling).

The first predetermined time determines the rate (i.e., the first predetermined rate) at which the processor 82 reads the global slot replacement statistics from the global memory 25b and updates the FTT estimate in register 102. In one illustrative embodiment, the first predetermined time is 4 seconds and thus, the first predetermined rate is every 4 seconds. Each director updates the FTT estimate continuously, at the first predetermined rate, as contrasted to an updating process that relies on an event to occur other than a predetermined rate.

Each of the processors of the plurality of adapters 21a–21n and 23a–23n reads the global slot replacement statistics and updates the FTT estimate at a different, unique time. In one embodiment, each of the processors reads the global slot replacement statistics and updates the FTT estimate at the same first predetermined rate, but at different times, as is achieved by initializing the respective scheduler 86 associated with each processor to a different time. For example, a first processor may read the global statistics and update its FTT estimate every 4 seconds starting at time 0 (e.g., at time 0 seconds, 4 seconds, 8 seconds, etc.) and the second processor may read the global statistics and update its FTT estimate every 4 seconds starting at time 0.3 seconds (e.g., 0.3 seconds, 4.3 seconds, 8.3 seconds, etc.).

It will be appreciated by those skilled in the art, that the first predetermined time can be varied to suit a particular embodiment and may be selected based on various considerations, such as the number of processors using the cache and the required FTT update frequency. In general, the first predetermined time reflects a balancing of the benefits of frequent updating of the fall through time estimate and the burden on the processors associated with performing this updating function.

Once the first predetermined time has lapsed as is controlled by the scheduler 86, the processor 82 reads the global slot replacement statistics from registers 70 and temporarily stores the values in memory associated with the adapter 80 according to processing block 124. Specifically, the Gsum value in register 74 and the Gcount value in register 72 are read from the global memory 25b.

In decision block 126, it is determined whether a second predetermined time, establishing a second predetermined rate, has lapsed. In the illustrative embodiment, the second predetermined time is longer than the first predetermined time and is a multiple of the first predetermined time. As one example, the second predetermined time is 16 seconds and thus, the second predetermined rate is every 16 seconds. As will become apparent, while the processor 82 reads the global slot replacement statistics from the global memory and updates the FTT estimate at the first predetermined rate, the processor calculates new global statistics and updates the global statistics in the global memory at the second predetermined rate. Like the FTT estimate, the global statistics can be characterized as being updated continuously. Providing the second predetermined time as a multiple of the first predetermined time results in the processor 82 updating the global statistics less often than the FTT estimate is updated. Since the second predetermined rate is a multiple of the first predetermined rate, every time new global statistics are calculated and updated in the global memory, the FTT of the cache is estimated. Specifically, and as will become apparent from consideration of FIG. 5, at the first predetermined rate (e.g., every 4 seconds), the FTT of the cache is estimated based on the read global statistics and, at the second predetermined rate (e.g., every 16 seconds), the FTT of the cache is estimated based on the new global statistics.

In one embodiment, each of the processors of a multiprocessor system is assigned a different time to update of the global statistics. For example, each processor is assigned a time for its first update of the global statistics based on the first predetermined rate multiplied by an integer that is smaller than the ratio of the second predetermined rate to the first predetermined rate and performs subsequent updates at the second predetermined rate. Various techniques are suitable for implementing this approach. In one embodiment, each time a processor executes the routine of FIG. 5, it is determined whether or not this is the time that the global statistics should be updated (i.e., if the second predetermined time has lapsed) and the processor determines whether or not the second predetermined time has lapsed using a unique number assigned to the respective adapter 21a–21n and 23a–23n and a modulo function. By way of example, consider the case where the first predetermined time is 4 seconds and the second predetermined time is 16 seconds. In this example, the first processor associated with an adapter no. 0 updates the global statistics the fourth time that the routine of FIG. 5 is executed, or at 12 seconds, and subsequently at each 16 second interval (i.e., at times 12 seconds, 28 seconds, and 44 seconds after it first executes the routine). A second processor associated with an adapter no. 1 updates the global statistics the third time that the process is executed and at 16 second intervals thereafter (i.e., at times 8 seconds, 24 seconds, and 40 seconds after it first executes the routine). The third processor associated with an adapter no. 2 updates the global statistics the second time that the routine is executed (i.e., at times 4 seconds, 20 seconds, 36 seconds after it first executes the routine), the fourth processor associated with an adapter no. 3 updates the global statistics the first time that the routine is executed (i.e., at times 0 seconds, 16 seconds, and 32 seconds after it first executes the routine), and a fifth processor associated with an adapter no. 4 updates the global statistics the fourth time that the routine is executed (i.e., at times 12 seconds, 28 seconds, 44 seconds after it first executes the routine), etc. Even though the times that the first and fifth processors update the global statistics coincide, because the scheduler of each processor is initialized to a different time, it is unlikely for these updates of the global statistics to occur at the same time and it is not a significant detriment if this condition does occur occasionally. The advantage of this arrangement is updating the global statistics continuously, at a substantially uniform rate.

If the second predetermined time has not lapsed, then processing block 142 is executed in which an updated FTT estimate is calculated by dividing the Gsum value in register 74 by the Gcount value in register 72 and the updated FTT estimate is written to register 102. The process then loops backs to decision block 122, as shown. In this way, the processor 82 updates the FTT estimate in register 102 at an interval established by the first predetermined time.

If the second predetermined time has lapsed, then decision block 128 is executed in which it is determined if the Gcount value in register 72 is greater than or equal to a predetermined threshold number. In one embodiment, the predetermined number is 109 (hex) which is selected so that even when the Gcount value is weighted in step 130 as described below, the Gcount value will not go below a predetermined value, here 100 (hex). That is, in this embodiment, the predetermined threshold number is chosen to be 109 (hex) or 265, since (265+16)(weighting factor, here 31/32)=101 (hex), where the factor of 16 is added to account for integer rounding.

Referring back to decision block 128, if it is determined that the global count value is at least equal to the predetermined number, then block 130 is executed in which a weighting factor is applied to the Gsum value and the Gcount value. In particular, the processor 82 multiplies the Gsum value by a weighting factor to generate a Gsumw value and stores the Gsumw value in register 98 and multiplies the Gcount value by the weighting factor to generate a Gcountw value and stores the Gcountw value in register 92. In one illustrative embodiment, the weighting factor is 31/32. However, more generally, the weighting factor is less than one and is selected to give a desired, lesser significance to the global slot replacement statistics than to the local slot replacement statistics, so as to react quickly to changes in cache usage while also smoothing the fall through time based on prior cache slot replacement data. The advantage of giving the global statistics a lesser significance than the local statistics is that, generally, the global statistics represent older data than the local statistics. In other words, some amount of data associated with slots most recently replaced by processor 82 will be accumulated by the processor (i.e., in the local statistics) before the data is reflected in the global statistics. However, it is not always the case that the local statistics represent more current information than the global statistics, for example as described below for an idle processor condition.

In processing block 136, a new Gsum value (Gsumnew) is calculated by adding the Gsumw value and the sum value and the Gsumnew value is stored in register 100. Similarly, a new Gcount value (Gcountnew) is calculated by adding the Gcountw value and the count value and the Gcountnew value is stored in register 94.

The reason for requiring a Gcount value of at least the predetermined number (i.e., requiring that the global statistics are the result of at least a threshold number of data cache slots having been replaced) as a prerequisite to applying the weighting factor to the global statistics in block 130 is that, if there is not a reasonable amount of global data, then to weight the global data to have less significance could cause inaccuracies in the resulting fall through time estimate. The Gcount value may be low when all of the processors are idle or when every I/O read operation results in a read hit. If there are too few global statistics, then adding the local statistics to the global statistics could cause a significant jump in the fall through time estimate, even where the local statistics reflect only a relatively small number of cache slot replacements. The predetermined number for the Gcount value is selected to be relatively small so that the fall through time estimate is based on real information, even for low cache miss activity (i.e., when cache slots are not being replaced often), but not so small that the resulting fall through time estimate is based on statistically meaningless data.

If it is determined in decision block 128 that the Gcount value is less than the predetermined number, then decision block 132 is executed in order to determine if the processor 82 is associated with a master adapter. According to an embodiment, one of the adapters 21a–21n and 23a–23n is a master and, as such, executes block 134 as follows. According to block 134, if processor 82 is the master cpu, a value related to the lapsed time since the global statistics were last updated by the processor 82 is added to the Gsum value. With this arrangement, a condition in which the processors are idle is likely to cause less significant jumps in the resulting fall through time estimate and a more accurate fall through time estimate that reflects the real condition of the cache is achieved. In one illustrative embodiment, one-half of the time that lapsed since the Gcount and Gsum values were last incremented is added to the Gsum value. It will be appreciated that different time values can be added to the Gsum value and also that one or more directors other than, or in addition to the master may perform block 134 in the manner described. In processing block 135, a new Gsum value (Gsumnew) is calculated by adding the Gsum value and the sum value and the Gsumnew value is stored in register 100. Similarly, a new Gcount value (Gcountnew) is calculated by adding the Gcount value and the count value and the Gcountnew value is stored in register 94.

In processing block 138, the local sum value and the local count value are reset to zero. In this way, these values represent data associated with only recently replaced data cache slots. In processing block 140, the new global slot replacement statistics, Gcountnew and Gsumnew, are written to the global memory FTT registers 72 and 74 to provide updated global statistics, Gcount and Gsum, respectively. In processing block 142, the updated FTT estimate is calculated by dividing the Gsumnew value in register 100 by the Gcountnew value in register 94 and the updated FTT estimate is written to register 102.

Having described the preferred embodiments of the invention, it will now become apparent to one of ordinary skill in the art that other embodiments incorporating their concepts may be used.

It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A method executed in a computer system for estimating a fall through time of a cache comprising:
   maintaining local statistics associated with each data cache slot replaced by the processor;
   reading from a memory global statistics related to each data cache slot replaced by a plurality of processors;
   calculating new global statistics in response to the read global statistics and the local statistics; and
   estimating at a predetermined rate a fall through time of the cache in response to the global statistics.

2. The method of claim 1 wherein estimating comprises:
   estimating at a first predetermined rate the fall through time of the cache in response to the read global statistics; and estimating at a second predetermined rate the fall through time of the cache in response to the new global statistics.

3. The method of claim 2 wherein reading is repeated starting at a first predetermined time and occurring at the first predetermined rate and wherein the reading by others of the plurality of processors is repeated starting at respective different first predetermined times and occurring at the first predetermined rate.

4. The method of claim 2 wherein calculating is repeated at the second predetermined rate that is a multiple of the first predetermined rate.

5. The method of claim 1 wherein ones of the plurality of processors calculate new global statistics at respective different times.

6. The method of claim 1 wherein maintaining local statistics comprises incrementing a count value (count) in response to a data cache slot being replaced by the processor and increasing a sum value (sum) by an amount equal to a time stamp difference associated with a data cache slot being replaced by the processor.

7. The method of claim 1 wherein the global statistics comprise a global count value (Gcount) related to a number of data cache slots replaced by the plurality of processors and a global sum value (Gsum) related to a summation of a time stamp difference associated with each of the data cache slots replaced by the plurality of processors.

8. The method of claim 7 further comprising determining if the Gcount value is greater than a predetermined number and wherein, in response to the Gcount value being greater than the predetermined number, calculating includes:
   applying a weighting factor to the global count value to generate a weighted global count value (Gcountw) and calculating the new global count value (Gcountnew) in response to the weighted global count value (Gcountw) and the count value (count); and
   applying the weighting factor to the global sum value to generate a weighted global sum value (Gsumw) and calculating the new global sum value (Gsumnew) in response to the weighted global sum value (Gsumw) and the sum value (sum).

9. The method of claim 7 further comprising determining if the Gcount value is greater than a predetermined number and wherein, in response to the Gcount value not being greater than the predetermined number, calculating includes:
   adding to the sum value a time lapse value related to a lapsed time; and
   calculating a new global count value (Gcountnew) in response to the count value (count) and the global count value (Gcount) and calculating a new global sum value (Gsumnew) in response to the sum value (sum) and the global sum value (Gsum).

10. The method of claim 6 further comprising resetting the count value and the sum value after the new global statistics are calculated.

11. The method of claim 8 wherein the weighting factor is less than one.

12. A method executed in a computer system for estimating a fall through time of a cache comprising:
   maintaining a count value (count) equal to a number of data cache slots replaced by a processor and a sum value (sum) equal to a summation of a time stamp difference associated with each data cache slot replaced by the processor;
   reading from a memory accessible by a plurality of processors a global count value (Gcount) related to a number of data cache slots replaced by the plurality of processors and a global sum value (Gsum) related to a summation of the time stamp difference associated with each of the data cache slots replaced by the plurality of processors;
   calculating a new global count value (Gcountnew) in response to the count value (count) and the global count value (Gcount) and calculating a new global sum value (Gsumnew) in response to the sum value (sum) and to the global sum value (Gsum), wherein the calculating is performed at a unique predetermined time different than a predetermined time that the new global count value and the new global sum value are calculated by others of the plurality of processors; and
   estimating a fall through time of the cache in response to the new global count value (Gcountnew) and the new global sum value (Gsumnew).

13. The method of claim 12 further comprising determining if the Gcount value is greater than a predetermined number and wherein, in response to the Gcount value being greater than the predetermined number, calculating includes:
   applying a weighting factor to the global count value to generate a weighted version of the global count value (Gcountw) and calculating the new global count value (Gcountnew) in response to the weighted version of the global count value (Gcountw) and the count value (count); and
   applying the weighting factor to the global sum value to generate a weighted version of the global sum value (Gsumw) and calculating the new global sum value (Gsumnew) in response to the weighted version of the global sum value (Gsumw) and the sum value (sum).

14. The method of claim 12 further comprising determining if the Gcount value is greater than a predetermined number and wherein, in response to the Gcount value not being greater than the predetermined number, calculating includes adding to the sum value a time lapse value related to a lapsed time.

15. The method of claim 12 further comprising resetting the count value and the sum value after the new global count value and the new global sum value are calculated.

16. The method of claim 13 wherein the weighting factor is less than one.

17. The method of claim 12 wherein reading is performed periodically at a first predetermined rate and calculating is performed periodically at a second predetermined rate that is a multiple of the first predetermined rate.

18. A system comprising:
   a cache including a plurality of slots; and
   a plurality of processors, each having access to the cache, maintaining local slot replacement statistics associated with the data cache slots replaced by the processor, reading global slot replacement statistics related to the data cache slots replaced by the plurality of processors and updating the global slot replacement statistics, wherein each processor comprises a fall through time estimator responsive to the global slot replacement statistics for estimating a fall through time of the cache at a predetermined rate.

19. The system of claim 18 wherein each processor reads the global slot replacement statistics at a different time and at the first predetermined rate.

20. The system of claim 18 wherein each processor updates the global slot replacement statistics at a second predetermined rate that is a multiple of the first predetermined rate.

21. An article comprising:

a storage medium having stored thereon instructions that when executed by a machine result in the following:

maintaining local statistics associated with each data cache slot replaced by the processor;

reading from a memory global statistics related to each data cache slot replaced by a plurality of processors;

calculating new global statistics in response to the read global statistics and the local statistics; and estimating at a predetermined rate a fall through time of the cache in response to the global statistics.

22. The article of claim 21 wherein reading is performed at a unique time, different than the time when the global statistics are read by others of the plurality of processors.

* * * * *

UNITED STATES PATENT AND TRADEMARK OFFICE
CERTIFICATE OF CORRECTION

| | | |
|---|---|---|
| PATENT NO. | : 7,155,573 B1 | Page 1 of 1 |
| APPLICATION NO. | : 10/853035 | |
| DATED | : December 26, 2006 | |
| INVENTOR(S) | : Levin-Michael et al. | |

It is certified that error appears in the above-identified patent and that said Letters Patent is hereby corrected as shown below:

Column 11, lines 5-6, delete "loops backs" and replace with -- loops back --.

Signed and Sealed this

Twenty-seventh Day of March, 2007

JON W. DUDAS
*Director of the United States Patent and Trademark Office*